(12) United States Patent
Lee et al.

(10) Patent No.: US 7,253,978 B2
(45) Date of Patent: Aug. 7, 2007

(54) METHODS AND APPARATUS DETERMINING AND/OR USING OVERSHOOT CONTROL OF WRITE CURRENT FOR OPTIMIZED HEAD WRITE CONTROL IN ASSEMBLED DISK DRIVES

(75) Inventors: Hae Jung Lee, Santa Clara, CA (US); Sang Lee, Pleasonton, CA (US); Keung Youn Cho, San Jose, CA (US)

(73) Assignee: Samsung Electronics Co., Ltd., Suwon, Kyungki-Do (KR)

( * ) Notice: Subject to any disclaimer, the term of this patent is extended or adjusted under 35 U.S.C. 154(b) by 0 days.

(21) Appl. No.: 11/176,414

(22) Filed: Jul. 6, 2005

(65) Prior Publication Data
US 2005/0264909 A1    Dec. 1, 2005

Related U.S. Application Data

(63) Continuation of application No. 10/294,115, filed on Nov. 14, 2002, now Pat. No. 6,975,475.

(51) Int. Cl.
*G11B 27/36* (2006.01)

(52) U.S. Cl. ............. 360/31; 360/46; 360/51; 360/55; 360/66; 360/68

(58) Field of Classification Search ............ None
See application file for complete search history.

(56) References Cited

U.S. PATENT DOCUMENTS

| | | | | |
|---|---|---|---|---|
| 5,121,260 A | * | 6/1992 | Asakawa et al. | 360/31 |
| 5,600,500 A | * | 2/1997 | Madsen et al. | 360/46 |
| 6,069,758 A | * | 5/2000 | Chung | 360/31 |
| 6,118,614 A | * | 9/2000 | Lee | 360/75 |
| 6,297,921 B1 | | 10/2001 | Price, Jr. et al. | |
| 6,445,521 B1 | * | 9/2002 | Schaff et al. | 360/31 |
| 6,549,353 B1 | * | 4/2003 | Teterud | 360/46 |
| 6,643,081 B1 | * | 11/2003 | Walker et al. | 360/31 |
| 6,696,832 B2 | | 2/2004 | Chew et al. | |
| 6,788,489 B1 | * | 9/2004 | Chang et al. | 360/77.08 |
| 6,954,322 B2 | * | 10/2005 | Yun et al. | 360/46 |
| 6,957,379 B1 | * | 10/2005 | Patapoutian et al. | 714/774 |
| 6,958,875 B2 | * | 10/2005 | Yun et al. | 360/66 |
| 6,975,475 B2 | * | 12/2005 | Lee et al. | 360/68 |
| 2004/0169947 A1 | * | 9/2004 | Yun et al. | 360/46 |
| 2004/0169953 A1 | * | 9/2004 | Yun et al. | 360/66 |
| 2005/0057835 A1 | * | 3/2005 | Kim et al. | 360/46 |
| 2005/0146803 A1 | * | 7/2005 | Kim et al. | 360/53 |

* cited by examiner

*Primary Examiner*—Andrea Wellington
*Assistant Examiner*—Dismery Mercedes
(74) *Attorney, Agent, or Firm*—Earle Jennings; GSS Law Group (57) ABSTRACT

The invention includes a testing method which may be applied to at least one writer in a disk drive during the self-test phase to generate write parameters, focused on the Over Shoot Control (OSC) of the write current parameter to improve the reliability of write operations by that writer. The Minimum OSC is used for write operations in normal temperatures. The Optimum OSC is used for a first lower temperature range, preferably between essentially 15 degrees Centigrade and essentially 5 degrees Centigrade. The Maximum OSC is preferred below essentially 5 degrees Centigrade. The Minimum OSC should preferably guarantee both an Adjacent Track Write (ATW) criteria, as well as guarantee a Write Induced Instability (WII) criteria. The invention includes the write parameter collection, as well as the disk drive containing the generated write parameter collection. The invention also includes the method of using that write parameter collection to control a writer while writing to tracks belonging to the radial zone collection and program systems implementing the invention's methods.

4 Claims, 12 Drawing Sheets

METHODS AND APPARATUS DETERMINING AND/OR USING OVERSHOOT CONTROL OF WRITE CURRENT FOR OPTIMIZED HEAD WRITE CONTROL IN ASSEMBLED DISK DRIVES

CROSS REFERENCE TO PENDING APPLICATIONS

This is a continuation of U.S. patent application Ser. No. 10/294,115, filed Nov. 14, 2002, now U.S. Pat. No. 6,975,475 which is incorporated herein by reference.

TECHNICAL FIELD

This invention relates to determining optimized head write parameters to improve hard disk reliability in the manufacturing process, specifically in the self-test phase of an assembled disk drive.

BACKGROUND ART

Disk drives are an important data storage technology. Read-write heads are one of the crucial components of a disk drive, directly communicating with a disk surface containing the data storage medium. It is crucial that each read-write head function reliably, otherwise the disk drive using that read-write head will fail to function reliably. This invention is focused on the optimized control of each read-write head during write operations within the disk drive. Before disclosing the invention, some relevant prior art will be discussed.

Figure 1A:
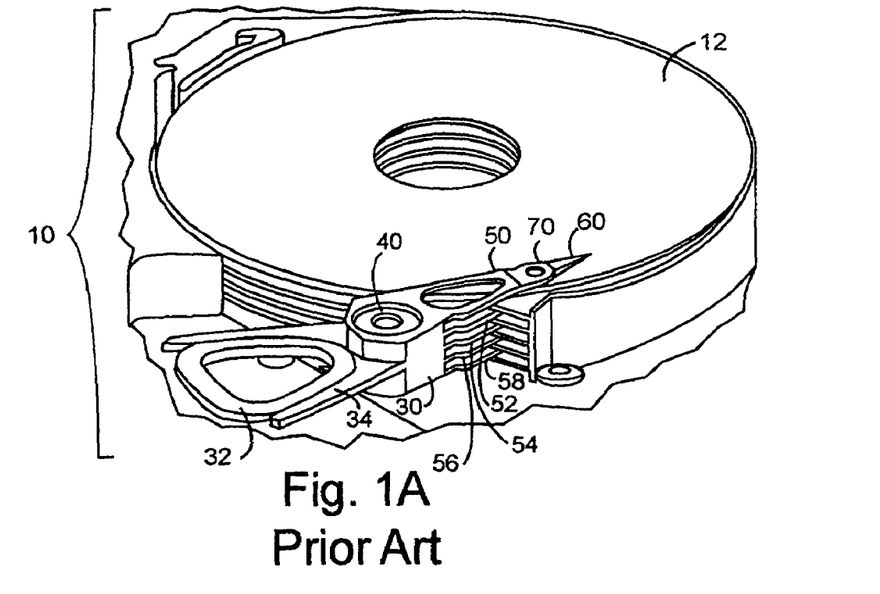
FIG. 1A illustrates a typical prior art high capacity disk drive 10 including actuator 30 with voice coil 32, actuator axis 40, actuator arms 50–58 with head gimbal assembly 60 placed among the disks.

FIG. 1A illustrates a typical prior art high capacity disk drive 10 including actuator 30 with voice coil 32, actuator axis 40, actuator arms 50–58 with head gimbal assembly 60 placed among the disks.

Figure 1B:
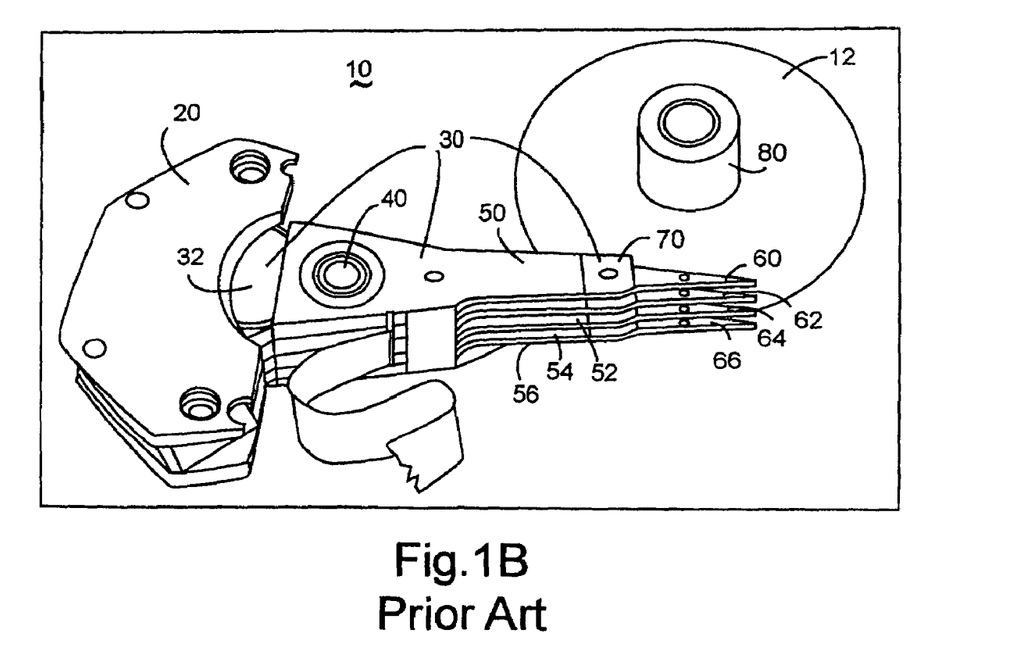
FIG. 1B illustrates a typical prior art high capacity disk drive 10 with actuator 20 including actuator 30 with voice coil 32, actuator axis 40, actuator arms 50–56 and head gimbal assemblies 60–66 with the disks removed.

FIG. 1B illustrates a typical prior art high capacity disk drive 10 with actuator 20 including actuator 30 with voice coil 32, actuator axis 40, actuator arms 50–56 and head gimbal assemblies 60–66 with the disks removed.

Figure 2A:
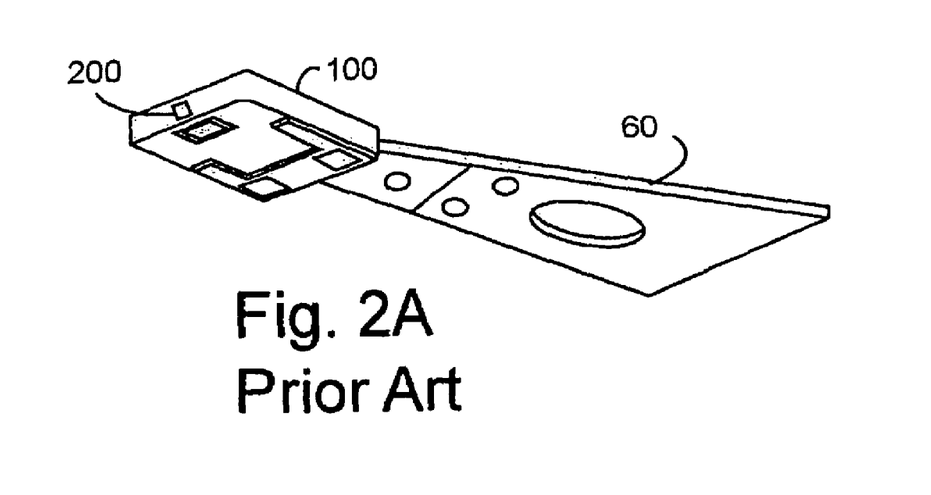
FIG. 2A illustrates a head gimbal assembly 60 including head suspension assembly with head slider 100 containing the read-write head 200 of the prior art.

FIG. 2A illustrates a head gimbal assembly 60 including head suspension assembly with head slider 100 containing the read-write head 200 of the prior art.

Since the 1980's, high capacity disk drives 10 have used voice coil actuators 20–66 to position their read-write heads over specific tracks. The heads 200 are mounted on head sliders 100, which float a small distance off the disk drive surface 12 when in operation. The flotation process is referred to as an air bearing. The air bearing is formed by the read-write heads 200, illustrated in FIG. 2A, and slider-head gimbal assembly 60, as illustrated in FIGS. 1A–2A. The flying height of the air bearing is very small, often about 100 Angstroms, or about 0.4 millionths of an inch.

Often there is one head per head slider for a given disk drive surface. There are usually multiple heads in a single disk drive, but for economic reasons, usually only one voice coil actuator.

Voice coil actuators are further composed of a fixed magnet actuator 20 interacting with a time varying electromagnetic field induced by voice coil 32 to provide a lever action via actuator axis 40. The lever action acts to move actuator arms 50–56, positioning head gimbal assemblies 60–66, and their associated head sliders 100 containing read-write heads 200, over specific tracks with speed and accuracy. Actuators 30 are often considered to include voice coil 32, actuator axis 40, actuator arms 50–56 and head gimbal assemblies 60–66. An actuator 30 may have as few as a single actuator arm 50. A single actuator arm 52 may connect with two head gimbal assemblies 62 and 64, each with at least one head slider.

Figure 2B:
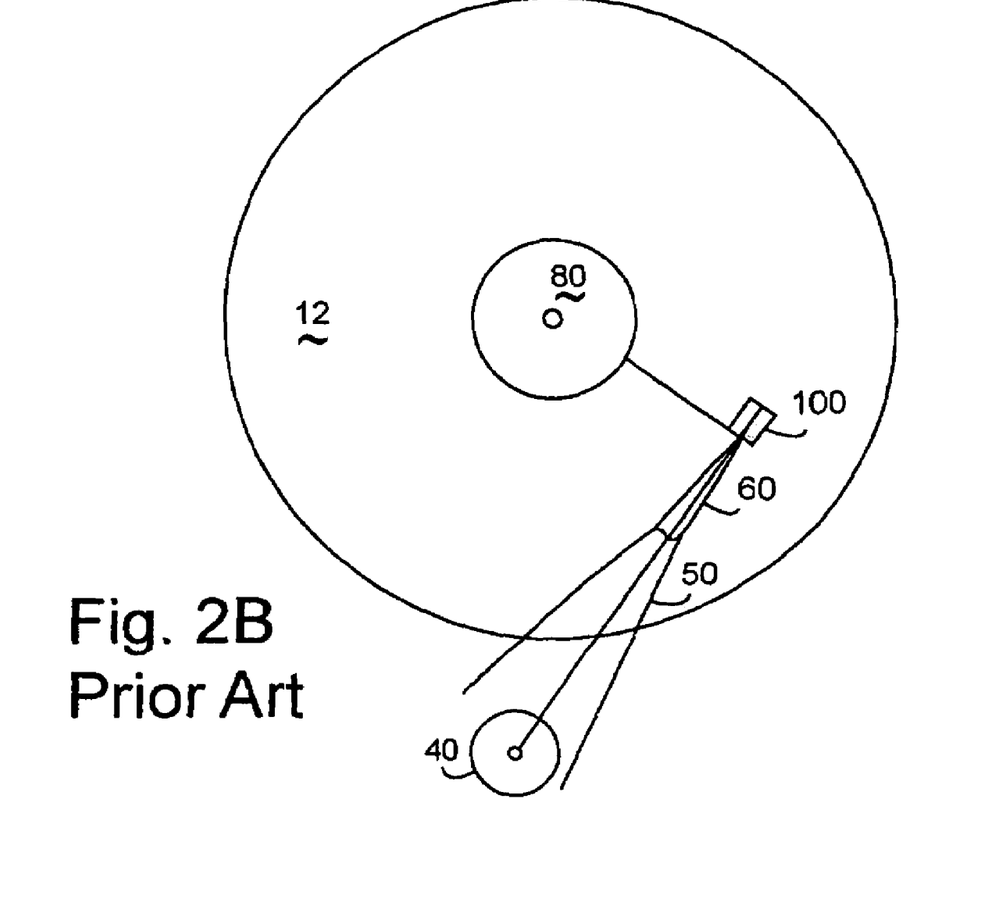
FIG. 2B illustrates the relationship between the principal axis 110 of an actuator arm 50 containing head gimbal assembly 60, which in turn contains head slider 100, as found in the prior art.

FIG. 2B illustrates the relationship between the principal axis of an actuator arm 50 containing head gimbal assembly 60, which in turn contains head slider 100, as found in the prior art.

Figure 2C:
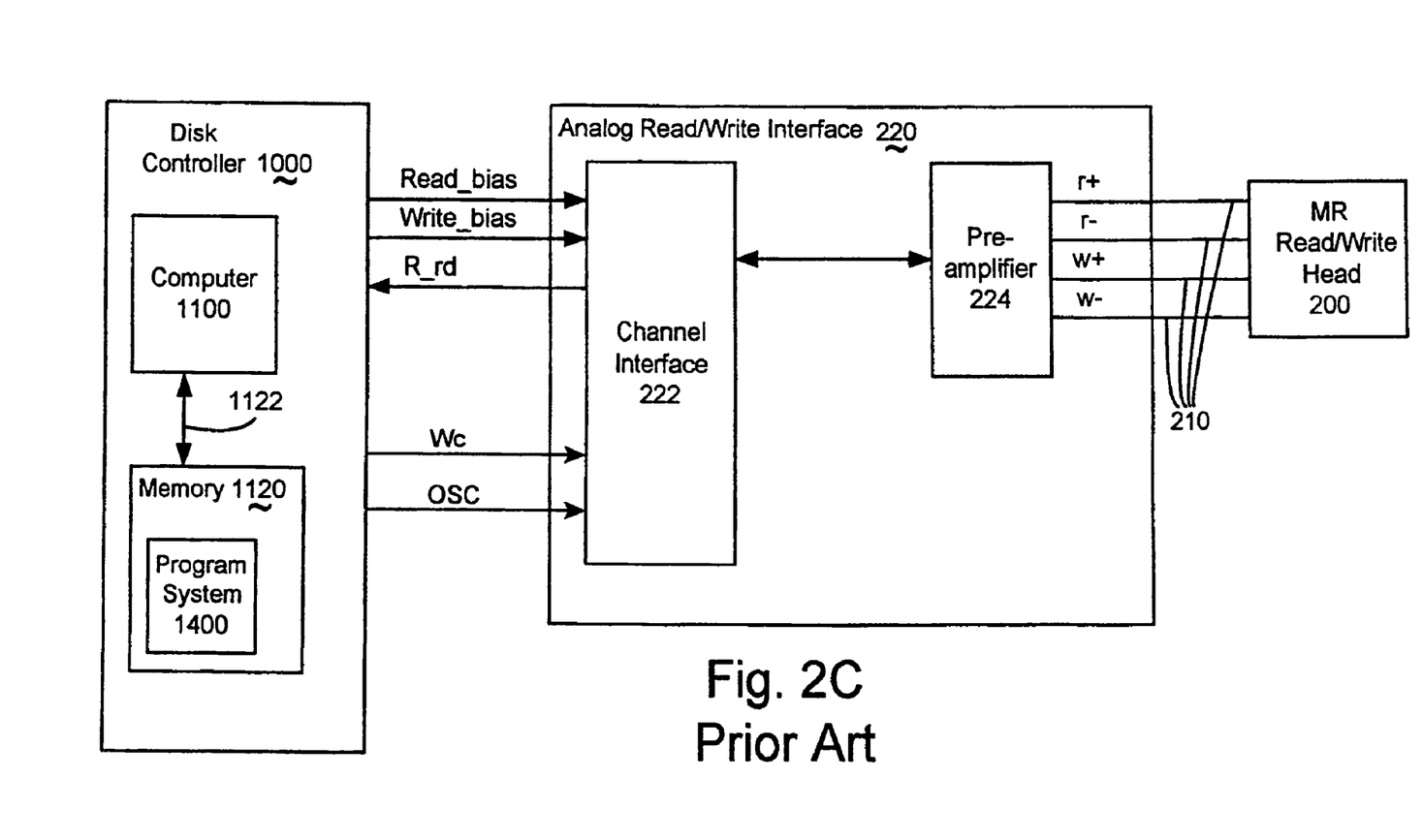
FIG. 2C illustrates a simplified schematic of a disk drive controller 1000 of the prior art, used to control an assembled disk drive 10.

FIG. 2C illustrates a simplified schematic of a disk drive controller 1000 of the prior art, used to control an assembled disk drive 10.

Disk drive controller 1000 controls an analog read-write interface 220 communicating resistivity found in the spin valve within read-write head 200.

Analog read-write interface 220 frequently includes a channel interface 222 communicating with pre-amplifier 224. Channel interface 222 receives commands, from embedded disk controller 100, setting at least the read_bias and write_bias.

Various disk drive analog read-write interfaces 220 may employ either a read current bias or a read voltage bias. By way of example, the resistance of the read head is determined by measuring the voltage drop (V_rd) across the read differential signal pair (r+ and r−) based upon the read bias current setting read_bias, using Ohm's Law.

Today, a disk drive performs an initialization process 1400 including what is often known as read channel optimization. Read channel optimization is supposed to find the best parameters for read/write operations, which include, at least, a read bias current (Ir), write current Iw and write boost.

Channel Statistical Measurements (CSM) are a standard system used in assembled disk drives to estimate channel performance, by measuring amplitude. The testing of disk drives by CSM gives only a partial quality measure. A more thorough quality measure is to determine the Bit Error Rate (BER).

As magnetic recording head 200 becomes smaller in physical size, there is an increased need optimize write field control in an assembled disk drive to minimize reliability problems. This need is difficult to fulfill, because it requires first discovering what are the reliability problem mechanisms within the assembled disk drive, and then configuring the disk drive to minimize the effects of the reliability problem mechanisms.

SUMMARY OF THE INVENTION

The invention addresses at least the needs discussed in the background.

Figure 3A:
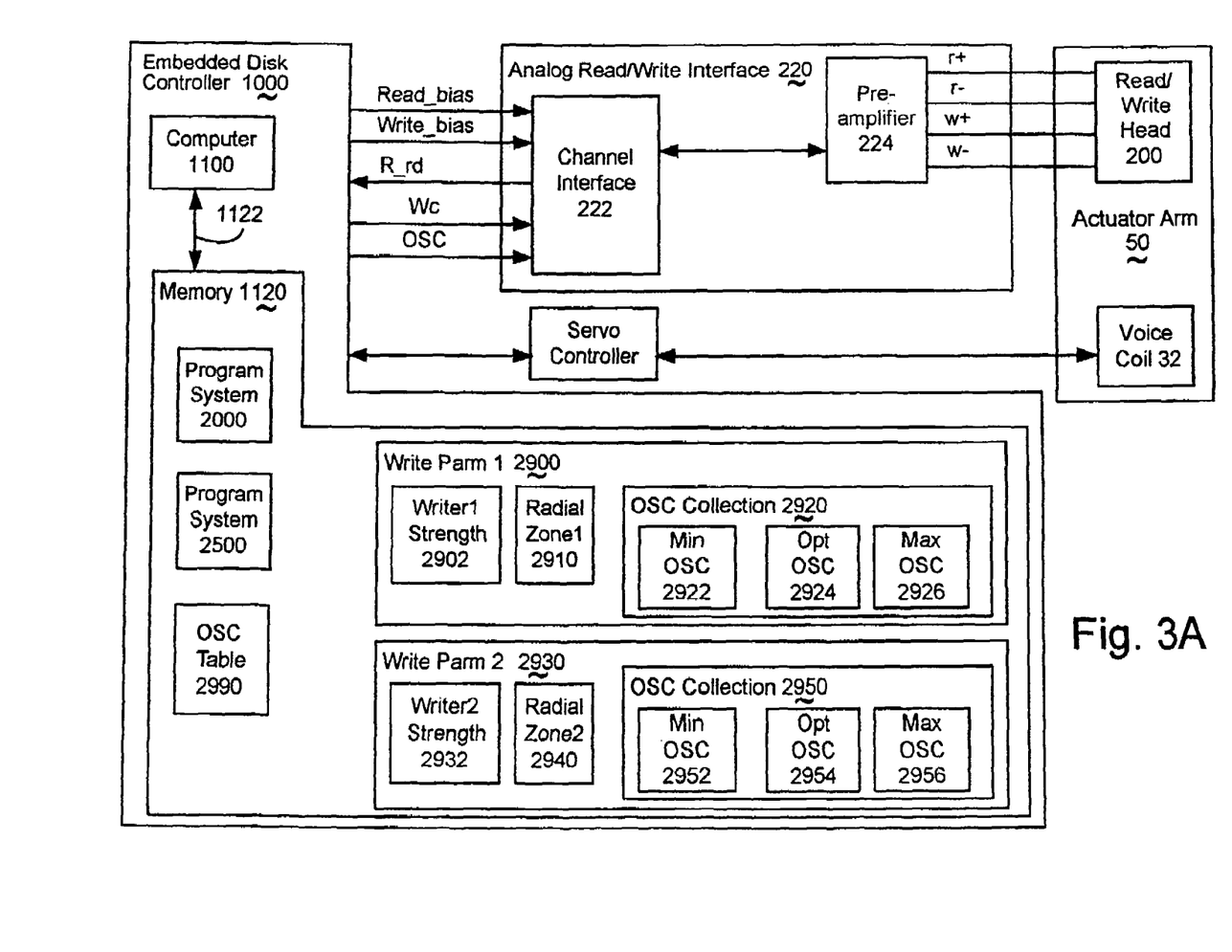
FIG. 3A illustrates aspects of the invention as a refinement of FIG. 2C.

The invention optimizes the write performance of a writer within a disk drive 10, including a read-write head 200 accessing a rotating disk surface 12, the coupled preamplifier 224, and the channel interface 222 coupled to the preamplifier 224 as illustrated in FIG. 3A.

The inventors discovered that the OverShoot Control (OSC) of the write current (Wc) should be controlled based upon the write field strength of the specific writer within the disk drive. Different writers within the same disk drive have been found to possess distinct write field strengths, requiring distinct OSC settings during normal temperature operation. The inventors have found that low temperature conditions again need distinct OSC settings based upon the write field strength of the writer.

These discoveries lead the inventors to the test method aspect of the invention, which is applied to at least one writer in a disk drive during the self-test phase of its manufacture. The testing method 2000 of FIGS. 3A–3B, generates write parameters 2900 of FIG. 3A, focused on the Over Shoot Control (OSC) of the write current parameter to improve the reliability of write operations by that writer. The OSC parameter is involved in at least the operation of the preamplifier 224.

The inventors discovered that a writer with a strong write field suffers significant reliability loss with high OSC due to increases in Adjacent Track Write (ATW) errors, Track Per Inch (TPI) margins, Write Induced Instabilities (WII), read-write head degradation, and Head to Disk Interference (HDI) caused by Thermal Pole Tip Protrusion (TPTP). The inventors also found that a writer with a weak write field does not suffer significant reliability loss with high OSC, opening the door to using higher OSC values without the same problems as a strong writer.

The inventors have found that determining at least three separate OSC parameters to be preferred for write operation control of the writer. The Minimum OSC is used for write operations within a normal temperature range. The Optimum OSC is preferably used for write operations in a first lower temperature range, preferably between essentially 15 degrees Centigrade and essentially 5 degrees Centigrade. The Maximum OSC is used for write operations below the first lower temperature range.

The Minimum OSC should preferably guarantee both an Adjacent Track Write (ATW) criteria, as well as guarantee Write Induced Instability (WII) criteria.

The inventors have found the test method should preferably be applied to at least four radial zones of the disk surface accessed by the writer, and then preferably interpolated to each radial zone of the disk surface. The radial zones of the disk surface each include multiple tracks on that disk surface with radial distances within that radial zone.

The test method should preferably be applied to each writer in the disk drive.

Figure 3B:
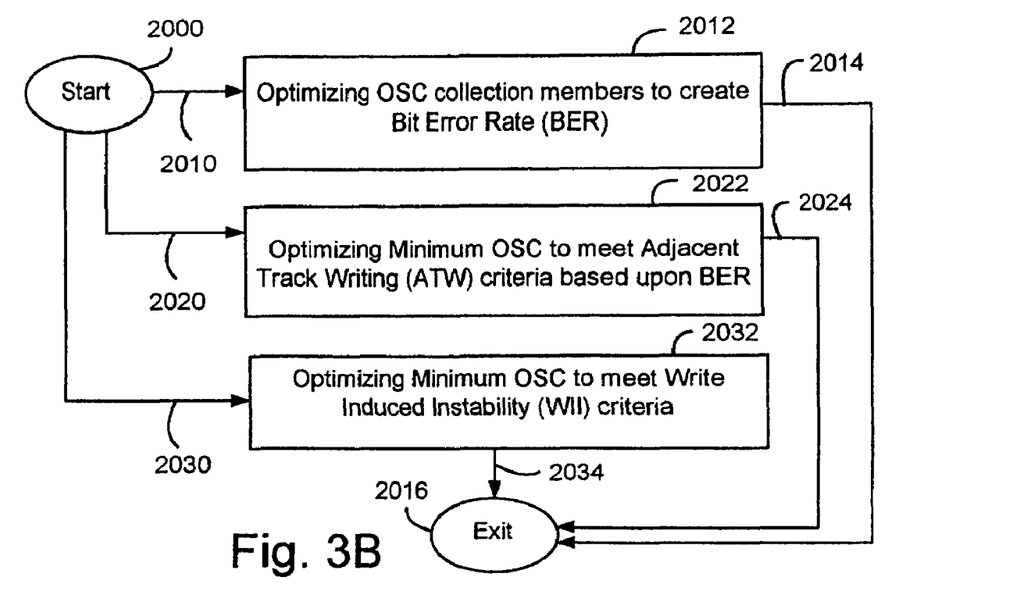
FIG. 3B illustrates a detail flowchart of program system 2000 of FIG. 3A generating write parameters 2900 including an OverShoot Control (OSC) collection 2920 of FIG. 3A, regarding a writer communicating with the members of a radial zone collection 2910.

The invention includes the write parameter collection 2900 illustrated in FIG. 3A and generated by the test method 2000, as illustrated in FIGS. 3A–3B, as well as the disk drive 10 containing the generated write parameter collection 2900. The invention also includes the method of using 2500 write parameter collection 2900 to control a writer 222-224-200 while writing to tracks belonging to the radial zone collection 2910, and the program systems implementing these methods 2000 and 2500.

These and other advantages of the present invention will become apparent upon reading the following detailed descriptions and studying the various figures of the drawings.

DETAILED DESCRIPTION OF THE INVENTION

The invention optimizes the write performance of a writer within a disk drive 10, including a read-write head 200 accessing a rotating disk surface 12, the coupled preamplifier 224, and the channel interface 222 coupled to the preamplifier 224 as illustrated in FIG. 3A.

The invention includes a testing method 2000 illustrated in FIGS. 3A–3B. The testing method is applied to at least one writer in a disk drive during the self-test phase to generate write parameters 2900, focused on the Over Shoot Control (OSC) of the write current parameter which improves the reliability of write operations by that writer. The OSC parameter is involved in at least the operation of the preamplifier 224.

The inventors discovered that the OSC should be controlled based upon the write field strength of the specific writer within the disk drive. Different writers within the same disk drive often possess distinct write field strengths, requiring distinct OSC settings during normal operation. The inventors found that low temperature conditions again need distinct OSC settings based upon the write field strength of the writer.

In the following figures are flowcharts of at least one method of the invention possessing arrows with reference numbers. These arrows will signify flow of control and sometimes data supporting implementations, including at least one program step, or program thread, executing upon a computer, inferential links in an inferential engine, state transitions in a finite state machine, and dominant learned responses within a neural network. Arrows include references 2010, 2014, 2020, 2024, 2030, and 2034 in FIG. 3B; 2050, 2054, 2060, 2064, 2070, and 2074 in FIG. 3C; 2110, 2114, 2120, and 2124 in FIG. 6A; 2130, 2134, 2150, and 2154 in FIG. 6B; 2170, and 2174 in FIG. 6C; 2230, 2234, 2240, 2244, 2250, and 2254 in FIG. 7A; 2270, 2274, 2280, 2284, 2290, and 2294 in FIG. 7B; 2510, 2514, 2520, and 2524 in FIG. 10A; and 2550, 2554, 2560, and 2564 in FIG. 10B.

The operation of starting a flowchart refers to at least one of the following. Entering a subroutine in a macro instruction sequence in a computer. Entering into a deeper node of an inferential graph. Directing a state transition in a finite state machine, possibly while pushing a return state. And triggering a collection of neurons in a neural network.

The operation of termination in a flowchart refers to at least one or more of the following. The completion of those operations, which may result in a subroutine return, traversal of a higher node in an inferential graph, popping of a previously stored state in a finite state machine, return to dormancy of the firing neurons of the neural network. Termination will be denoted by the word "Exit" in the center of an oval and includes the following references: 2016 in FIG. 3B; 2056 in FIG. 3C; 2116 in FIG. 6A; 2136 in FIG. 6B; 2176 in FIG. 6C; 2236 in FIG. 7A; 2276 in FIG. 7B; 2516 in FIG. 10A; and 2556 in FIG. 10B.

A computer as used herein will include, but is not limited to an instruction processor. The instruction processor includes at least one instruction processing element and at least one data processing element, each data processing element controlled by at least one instruction processing element.

The inventors adopted an approach based upon the premise that the OSC needs to be reduced as much as possible for the least loss in Bit Error Rate (BER), for the best use of the writer during the write operation. The inventors also explored a number of optimization schemes and found that constraining Minimum OSC 2922 to guarantee both an Adjacent Track Write (ATW) criteria, as well as guarantee a Write Induced Instability (WII) criteria, lead to significant reliability improvements.

FIG. 3A illustrates aspects of the invention as a refinement of FIG. 2C.

Two separate program systems are illustrated residing in Memory 1120. During self-test, after assembling disk drive 10, an initialization program 2000 generates at least one write parameter collection 2900. During regular operations, essentially after initialization, program system 3000, uses one or more write parameter collections 2900, 2930 to perform write operations. These write operations use the appropriate writer to the tracks of the related radial zones using the OSC collection 2920 members based upon estimates of the ambient temperature of the disk surface 12 being accessed.

Note that memory 1120 may include both volatile and non-volatile memory components. Initialization program system 3000 may preferably reside in a volatile memory component, essentially disappearing after self-test initialization. Write parameter collections 2900, as well as program system 3000, preferably reside in one or more non-volatile memory components, and are available whenever the system is powered up. Note that during initialization process 2000, write parameter collection 2900 may preferably reside in a volatile memory component, and eventually be installed in a non-volatile memory component toward the end of initialization.

The radial zones of the disk surface each include multiple tracks on that disk surface with radial distances within that radial zone. A disk drive may preferably have as many as 15 to 30 radial zones in many contemporary applications.

The inventors found that a writer with a strong write field suffers significant reliability loss with high OSC due to increases in Adjacent Track Write (ATW) errors, Track Per Inch (TPI) margins, Write Induced Instabilities (WII), read-write head degradation, and Head to Disk Interference (HDI) caused by Thermal Pole Tip Protrusion (TPTP). The inventors found that a writer with a weak write field does not suffer significant reliability loss with high OSC, opening the door to using higher OSC without the same problems as a strong writer.

Thermal Pole Tip Protrusion (TPTP) is caused by the materials in and around the head slider expanding during write operations until part of those materials protrude, leading to contact with the rotating disk surface. Contact can degrade the write performance by altering the flying height. Contact can also wear down part of the disk surface. Taking into account TPTP gave the inventors significant insight into both read-write head degradation and Head to Disk Interference (HDI). The inventors have found that optimization of Overshoot Control (OSC), as disclosed herein, can minimize this problem to some extent.

FIG. 3B illustrates a detail flowchart of program system 2000 of FIG. 3A generating write parameters 2900 including an OverShoot Control (OSC) collection 2920 of FIG. 3A, regarding a writer communicating with the members of a radial zone collection 2910. Radial zone collection 2910 includes radially consecutive tracks on rotating disk surface 12 within disk drive 10.

The writer is contained within the disk drive 10. The writer is comprised of a read-write head 200 communicating with a rotating disk surface 12, a preamplifier 224 coupled with the read-write head 200 and a channel interface 222 coupled with the preamplifier 224, within the disk drive 10. The OSC collection 2920 includes an Optimum OSC 2924, a Minimum OSC 2922, and a Maximum OSC 2926.

Operation 2012 performs optimizing the OSC collection 2920 members to create a Bit Error Rate (BER). Operation 2022 performs optimizing the Minimum OSC 2922 to meet an Adjacent Track Writing (ATW) criteria based upon the BER. Operation 2032 performs optimizing the Minimum OSC 2922 to meet a Write Induced Instability (WII) criteria.

Figure 3C:
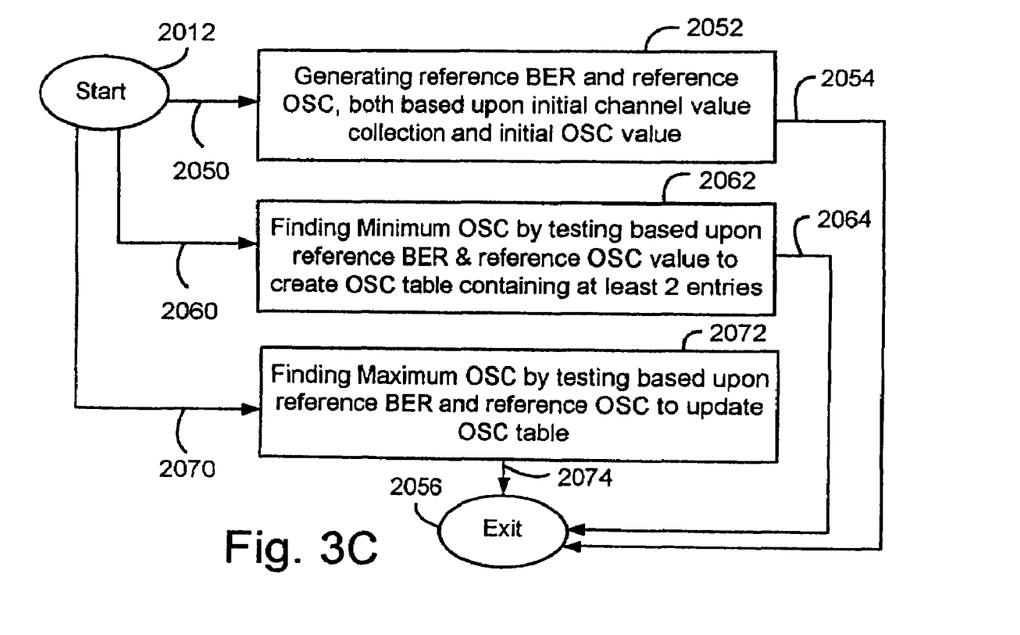
FIG. 3C illustrates a detail flowchart of operation 2012 of FIG. 3B further regarding the writer communicating with the radial zone collection 2910 members, optimizing the OSC Collection 2920 members to create the BER.

FIG. 3C illustrates a detail flowchart of operation 2012 of FIG. 3B further regarding the writer communicating with the radial zone collection 2910 members, optimizing the OSC Collection 2920 members to create the BER.

Operation 2052 performs generating a reference BER and a reference OSC, both based upon an initial channel value collection and an initial OSC value. Operation 2062 performs finding the Minimum OSC 2922 by testing based upon the reference BER and the reference OSC value to create an OSC table 2990 containing at least two entries. Operation 2072 performs finding the Maximum OSC 2926 by testing, based upon the reference BER and the reference OSC to update the OSC table 2990.

The initial channel value collection and initial OSC value may preferably be generated as a result of performing one or both of the following. Read channel optimizing for other parameters based upon default values of the write current and of the OSC to create an initial Read Channel Optimization (RCO) parameter list, and read channel optimizing to create an initial write current and the initial OSC based upon the other initial RCO parameters. The initial OSC is based at least partially upon the default write current and the default OSC. Note that the RCO parameter list will include not only a write current (Wc), a write OverShoot Control (OSC), but also a read bias (Read_bias) and write bias (Write_bias) as illustrated in FIGS. 2C and 3A.

Note that each of the OSC table 2990 entries contains an OSC value and a BER test value. The Optimum OSC 2924 is determined from the OSC table 2990 to have a minimum BER test value, regarding the writer communicating with tracks of the radial zone collection 2910.

Figure 4:
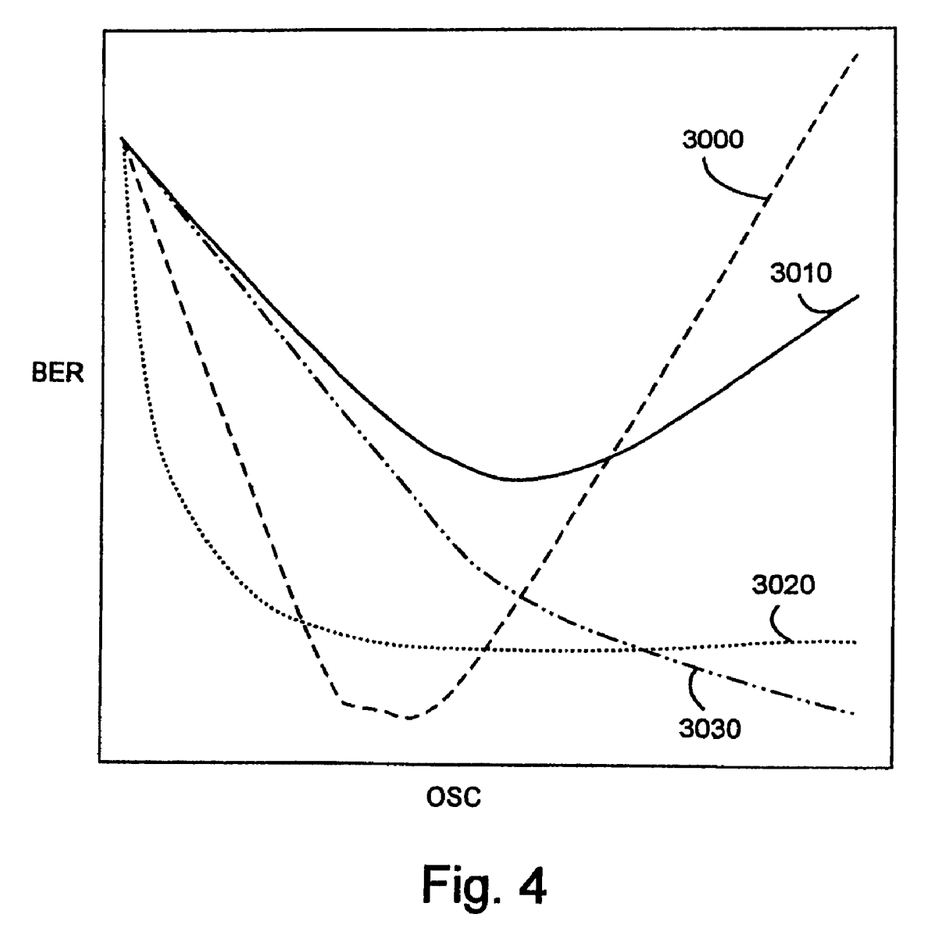
FIG. 4 illustrates the effects of the Write Strength 2902 of various writers with and without the presence of Thermal Pole Tip Protrusion (TPTP), with the Bit Error Rate (BER) represented by the vertical axis as a function of OSC as the horizontal axis.

FIG. 4 illustrates the effects of the Write Strength 2902 of various writers with and without the presence of Thermal Pole Tip Protrusion (TPTP), with the Bit Error Rate (BER) represented by the vertical axis as a function of OSC as the horizontal axis.

In FIG. 4, trace 3000 illustrates a very strong writer with the presence of TPTP. The inventors found that the disk controller should use a lower OSC when operating the writer in normal temperatures. The inventors also found that the disk controller should not use much higher OSC values for low temperature operations.

In FIG. 4, trace 3010 illustrates a weak writer with the presence of TPTP. The inventors found that the disk controller can use a lower OSC when operating the writer in normal temperatures with minimal BER increases. The inventors also found that the disk controller should not use higher OSC values for low temperature operations.

In FIG. 4, trace 3020 illustrates a very strong writer without the presence of TPTP. The inventors found that the disk controller should use a lower OSC when operating the writer in normal temperatures. The inventors also found that the disk controller can use much higher OSC values for low temperature operations.

In FIG. 4, trace 3030 illustrates a weak writer without the presence of TPTP. The inventors found that the writer can use a lower OSC when operating the writer in normal temperatures with minimal BER increases. The inventors also found that the writer needs higher OSC values for low temperature operations.

Determining at least three separate OSC parameters is preferred for write operation control of the writer. The Minimum OSC 2922 is preferred for normal write temperatures. The Optimum OSC 2924 is preferred in a first lower temperature range between essentially 15 degrees Centigrade and essentially 5 degrees Centigrade. The Maximum OSC 2926 is preferred below the first lower temperature range.

Figure 5:
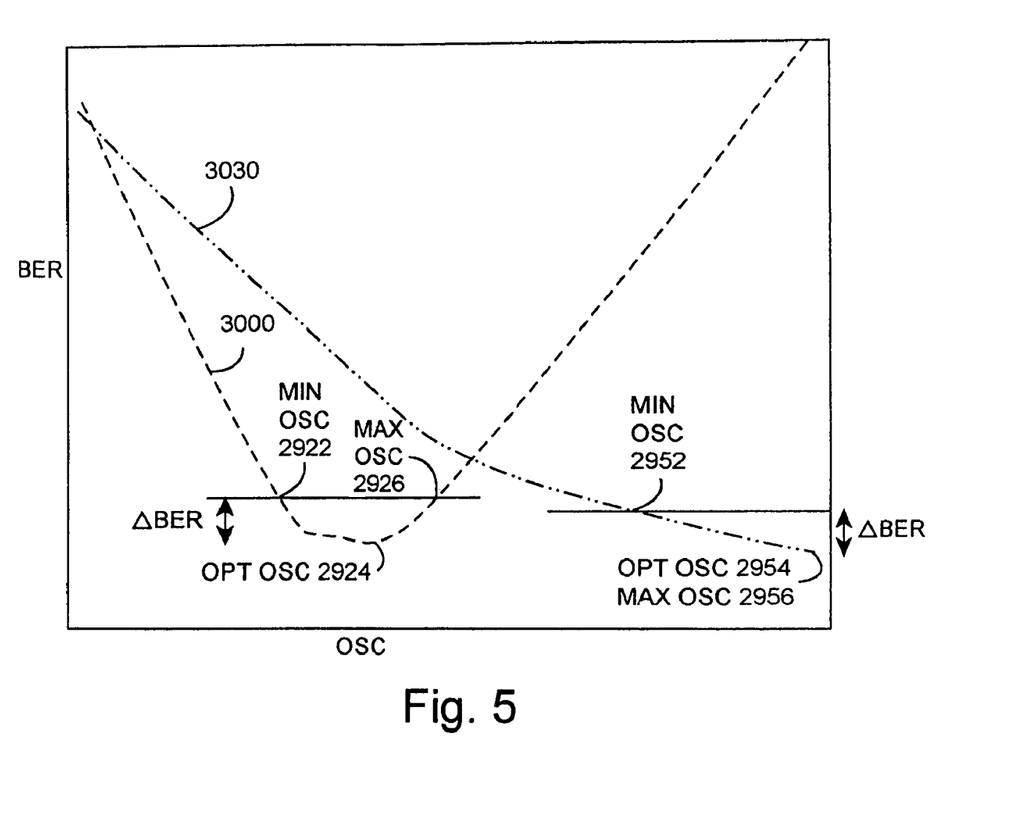
FIG. 5 illustrates the basic concept of OSC optimization using the strong writer with TPTP trace 3000 and the weak writer without TPTP trace 3020 from FIG. 4.

FIG. 5 illustrates the basic concept of OSC optimization using the strong writer with TPTP trace 3000 and the weak writer without TPTP trace 3020 from FIG. 4.

The inventors found that for a strong writer 3000, an optimum OSC 2924 exists, often as the bottom of a bathtub shape, as illustrated by trace 3000 of FIGS. 4 and 5. Too high an OSC value increases the Bit Error Rate (BER), due to too strong a write field, or to Head Disk Interference (HDI) related issues. These problems occurred most often near the Outside Diameter tracks of the disk surface 12 communicating with the writer. The inventors also found that strong writers do not need much of an increase in OSC for operating below normal temperatures.

The inventors found that for a weak writer 3020, there is a need for greater OSC, particularly near the Outside Diameter tracks under normal temperatures. The Bit Error Rate (BER) tends to saturate when using the higher OSC range, particularly for most of the tracks from the Middle Diameter to the Inside Diameter. Weak writers tend to need significantly increased OSC for low temperature operation.

In FIG. 5, for a strong writer 3000, the Minimum OSC 2922 and Maximum OSC 2926 are essentially within ΔBER multiplied by the minimum Bit Error Rate (BER), which occurs using the Optimum OSC 2924. For a weak writer 3020, the Minimum OSC 2952 is essentially within ΔBER multiplied by the minimum Bit Error Rate (BER), which occurs using the Optimum OSC 2954. Note that for the weak writer 3020, the Maximum OSC 2956 is essentially the same as the Optimum OSC 2954, both of which are at the maximum feasible OSC. ΔBER is a fraction, preferably about 0.3.

These three members of the OSC collection 2920, regarding the strong writer 3000 for a radial zone collection 2910 of tracks, are all smaller than any of the OSC collection 2950 members regarding the weak writer 3020 for a radial zone collection 2940.

Figure 6A:
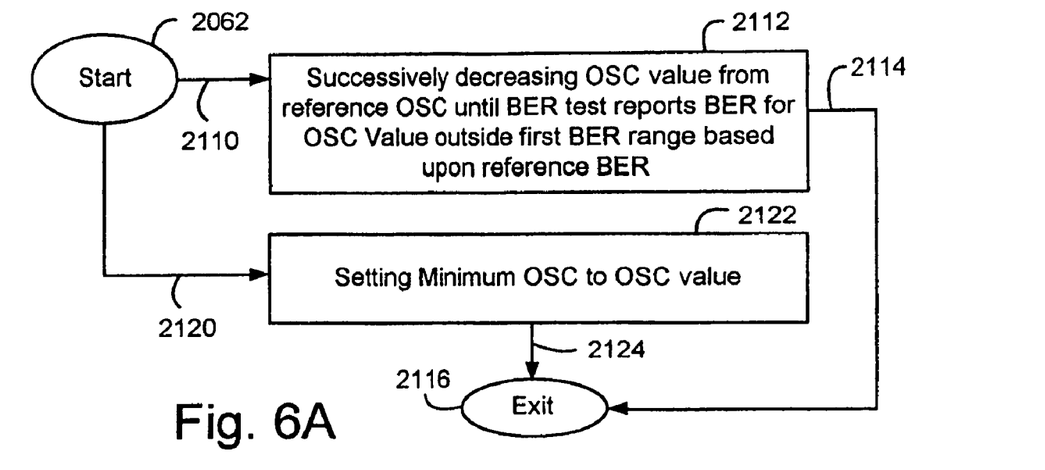
FIG. 6A illustrates a detail flowchart of operation 2072 of FIG. 3C further regarding the writer communicating with the radial zone collection members, finding the Minimum OSC 2922.

FIG. 6A illustrates a detail flowchart of operation 2072 of FIG. 3C further regarding the writer communicating with the radial zone collection members, finding the Minimum OSC 2922.

Operation 2112 successively decreases an OSC value from the reference OSC until a bit error rate test reports a BER for the OSC Value outside a first bit error rate range based upon the reference BER. Operation 2122 performs setting the Minimum OSC 2922 to the OSC value.

Figure 6B:
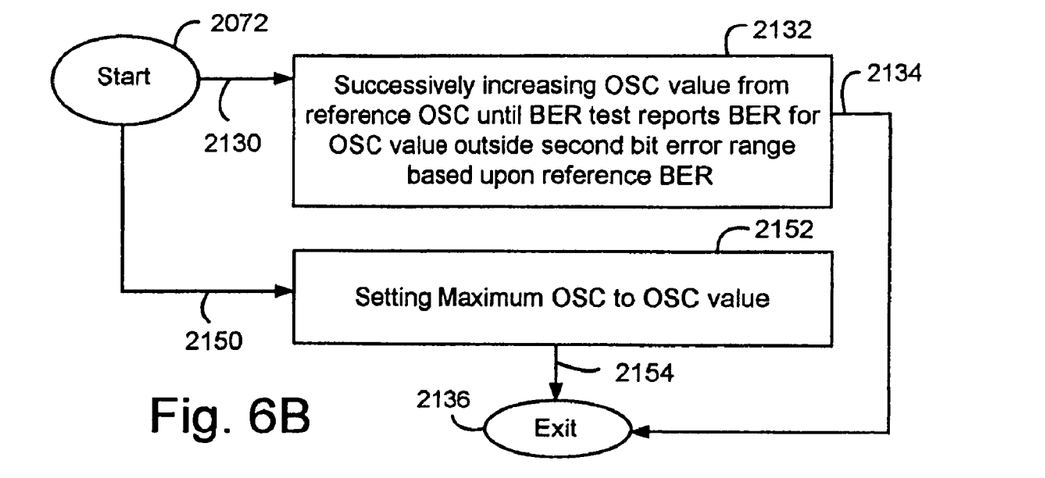
FIG. 6B illustrates a detail flowchart of operation 2082 of FIG. 3C further regarding the writer communicating with the radial zone collection members, finding the Maximum OSC 2926.

FIG. 6B illustrates a detail flowchart of operation 2082 of FIG. 3C further regarding the writer communicating with the radial zone collection members, finding the Maximum OSC 2926.

Operation 2132 performs successively increasing an OSC value from the reference OSC until a bit error rate test reports a BER for the OSC value outside a second bit error range based upon the reference BER. Operation 2142 performs setting the Maximum OSC 2926 to the OSC value.

The reference BER is preferably the minimum BER as illustrated in FIG. 5. The first bit error range and second bit error range may be distinct ranges, but preferably are within ΔBER multiplied by the reference BER.

Figure 6C:
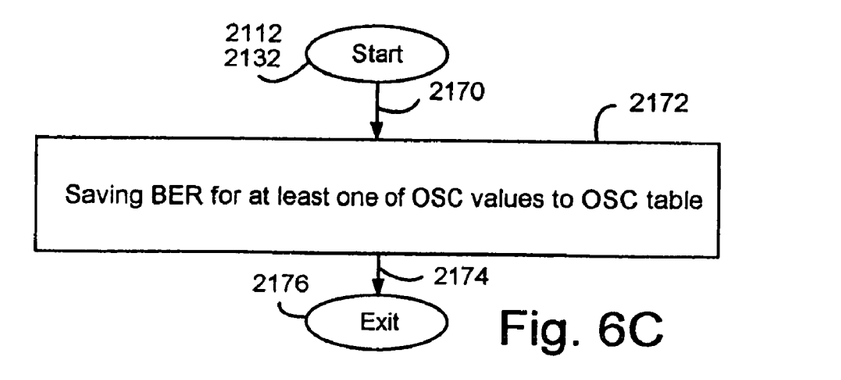
FIG. 6C illustrates a detail flowchart of operation 2112 of FIG. 6A further successively decreasing the OSC value, and operation 2132 of FIG. 6B further performs successively increasing the OSC value.

FIG. 6C illustrates a detail flowchart of operation 2112 of FIG. 6A further successively decreasing the OSC value, and operation 2132 of FIG. 6B further performs successively increasing the OSC value.

Operation 2172 performs saving the BER for at least one of the OSC values to the OSC table 2990.

The radial zone collection preferably includes a first track, two radially neigboring tracks, and a radial neighborhood strip collection containing the first track and the two radially neighboring tracks. The radial neighborhood strip collection preferably includes at least two additional tracks belonging to the radial zone collection. The radial neighborhood collection preferably includes a total of 21 tracks radially neighboring the first track.

Figure 7A:
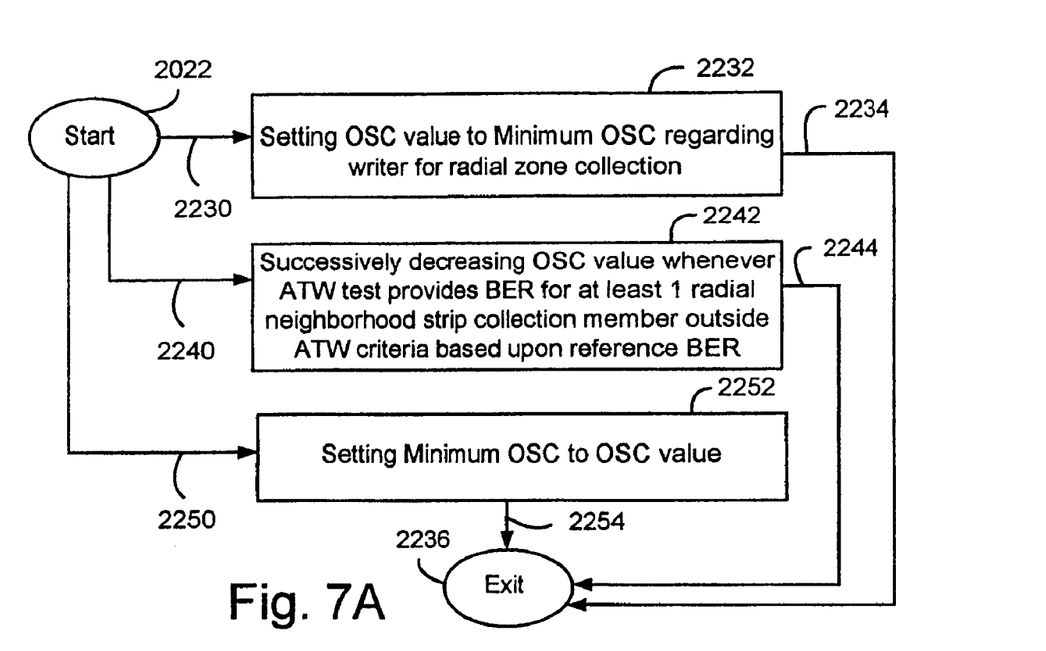
FIG. 7A illustrates a detail flowchart of operation 2022 of FIG. 3B further regarding the writer communicating with the radial zone collection 2910 members, optimizing the Minimum OSC 2922 to meet the ATW criteria.

FIG. 7A illustrates a detail flowchart of operation 2022 of FIG. 3B further regarding the writer communicating with the radial zone collection 2910 members, optimizing the Minimum OSC 2922 to meet the ATW criteria.

Operation 2232 performs setting an OSC value to the Minimum OSC 2922. Operation 2242 successively decreases the OSC value, whenever an Adjacent Track Write (ATW) test using the OSC Value provides a BER, for at least one of the radial neighborhood strip collection members, outside the ATW criteria based upon the reference BER. Operation 2252 performs setting the Minimum OSC 2922 to the OSC value.

Figure 7B:
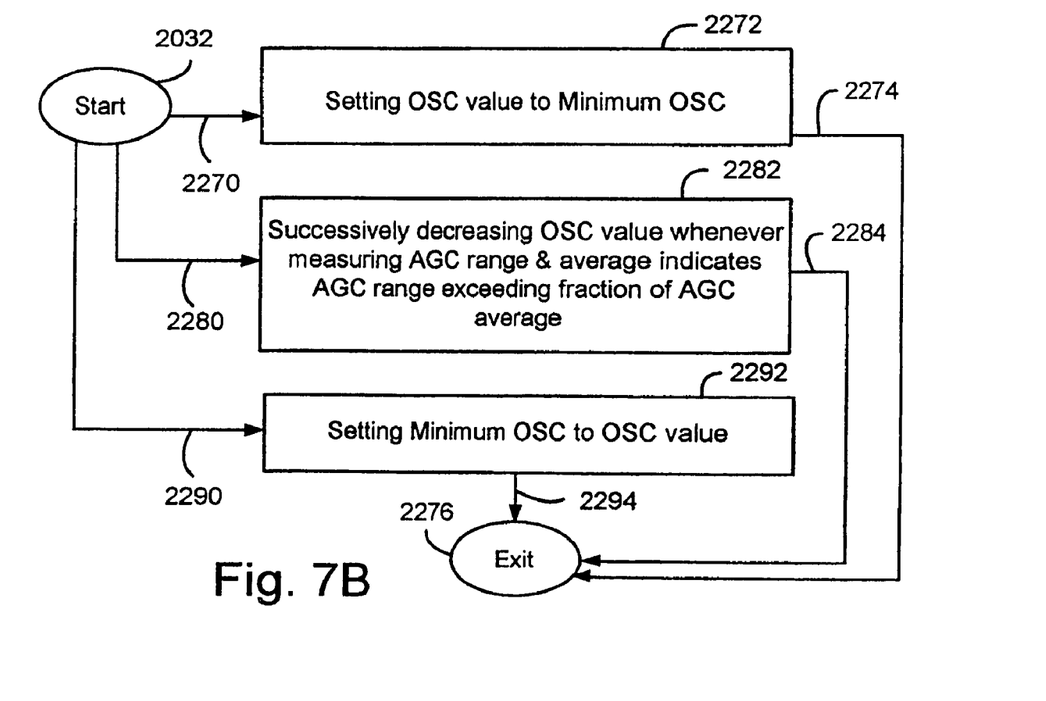
FIG. 7B illustrates a detail flowchart of operation 2032 of FIG. 3B further regarding the writer communicating with the radial zone collection members, the step optimizing the Minimum OSC 2922 to meet the WII criteria.

FIG. 7B illustrates a detail flowchart of operation 2032 of FIG. 3B further regarding the writer communicating with the radial zone collection members, the step optimizing the Minimum OSC 2922 to meet the WII criteria.

Operation 2272 performs setting an OSC value to the Minimum OSC 2922. Operation 2282 successively decreases the OSC value whenever measuring an Automatic Gain Control (AGC) range and an AGC average, based upon repeated writing using the OSC value of a track belonging to the radial zone collection, indicates the AGC range exceeding a fraction of the AGC average. Operation 2292 performs setting the Minimum OSC 2922 to the OSC value.

Figure 8:
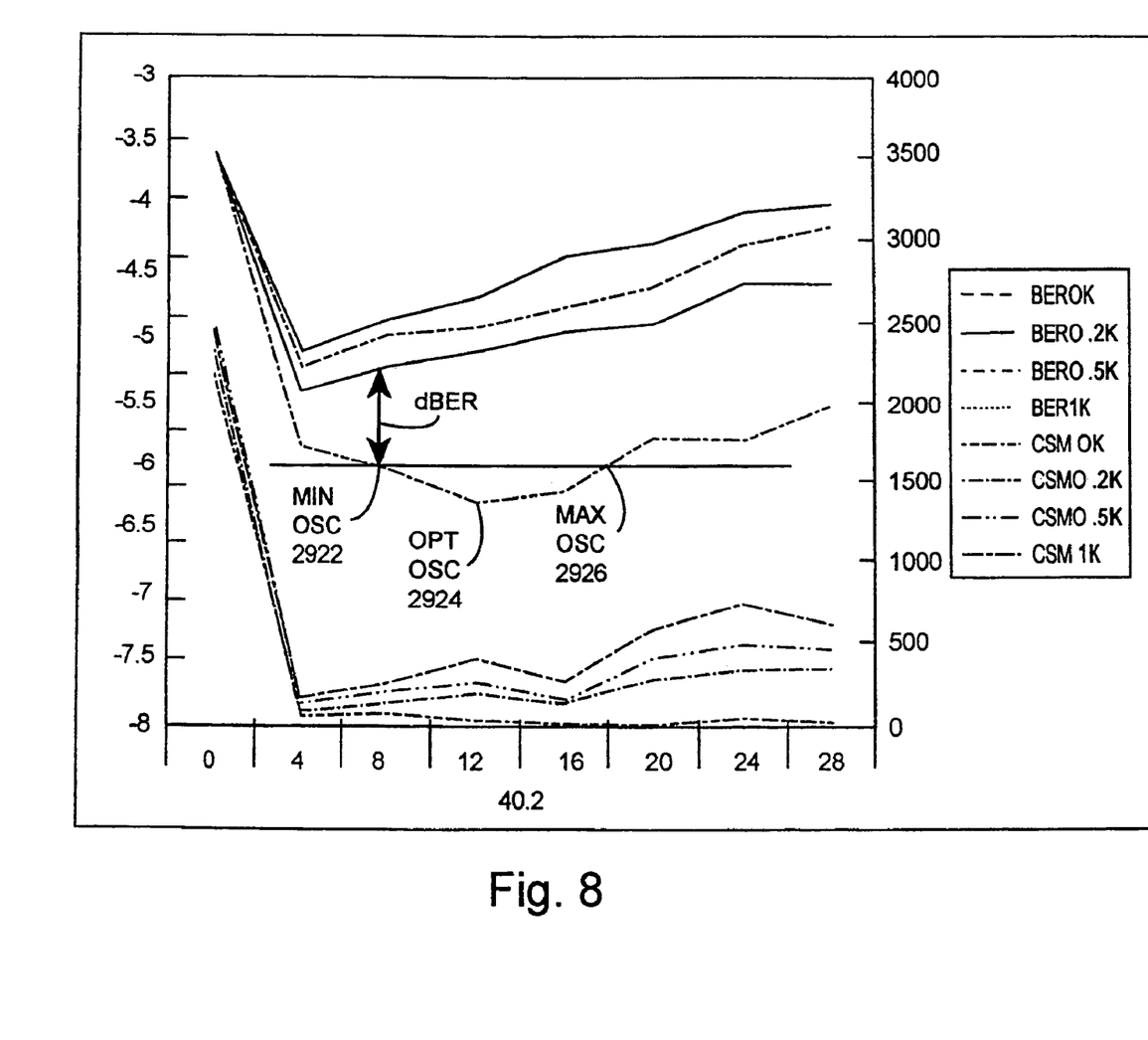
FIG. 8 illustrates the basic concept of optimizing the Minimum OSC 2902 to meet the ATW criteria of operation 2022 of FIGS. 3B and 7A.

FIG. 8 illustrates the basic concept of optimizing the Minimum OSC 2902 to meet the ATW criteria of operation 2022 of FIGS. 3B and 7A.

The horizontal axis of FIG. 8 represents a write current setting of 40.2 mA, and OSC settings from 0 to 28. The vertical axis on the left represents the logarithm base 10 of the Bit Error Rate (BER). The vertical axis on the right Channel Statistical measurements (CSM) from 0 to 4000.

In FIG. 8, traces from 3070 and above represent the adjacent track bit error rates measured after repeated writing of the adjacent tracks to the test track by operation 2292. The trace 3072 represents the BER curve for a strong writer. The traces below 3072 represent the CSM values measured for the corresponding BER traces 3070 and above.

FIG. 8 indicates the experimental findings of the inventors regarding adjacent track writing errors and the relationship of Write Current Wc and OverShoot Control OSC based upon the strength of a writer. The higher the write strength of a writer, the greater the increased adjacent track writing noise from increased OSC. The increased adjacent track writing noise can be seen as increase in the log of BER.

The inventors concluded, as illustrated in FIG. 8, that the Minimum OSC 2922 should guarantee an ATW criteria, which is preferably 10^1.5 multiplied by the BER loss after a repetition of preferably 200 times writing both adjacent tracks. The inventors found that if the ATW criteria is not satisfied, the Minimum OSC 2922 should be decreased, and the ATW test performed again, until the ATW criteria is met.

Figure 9:
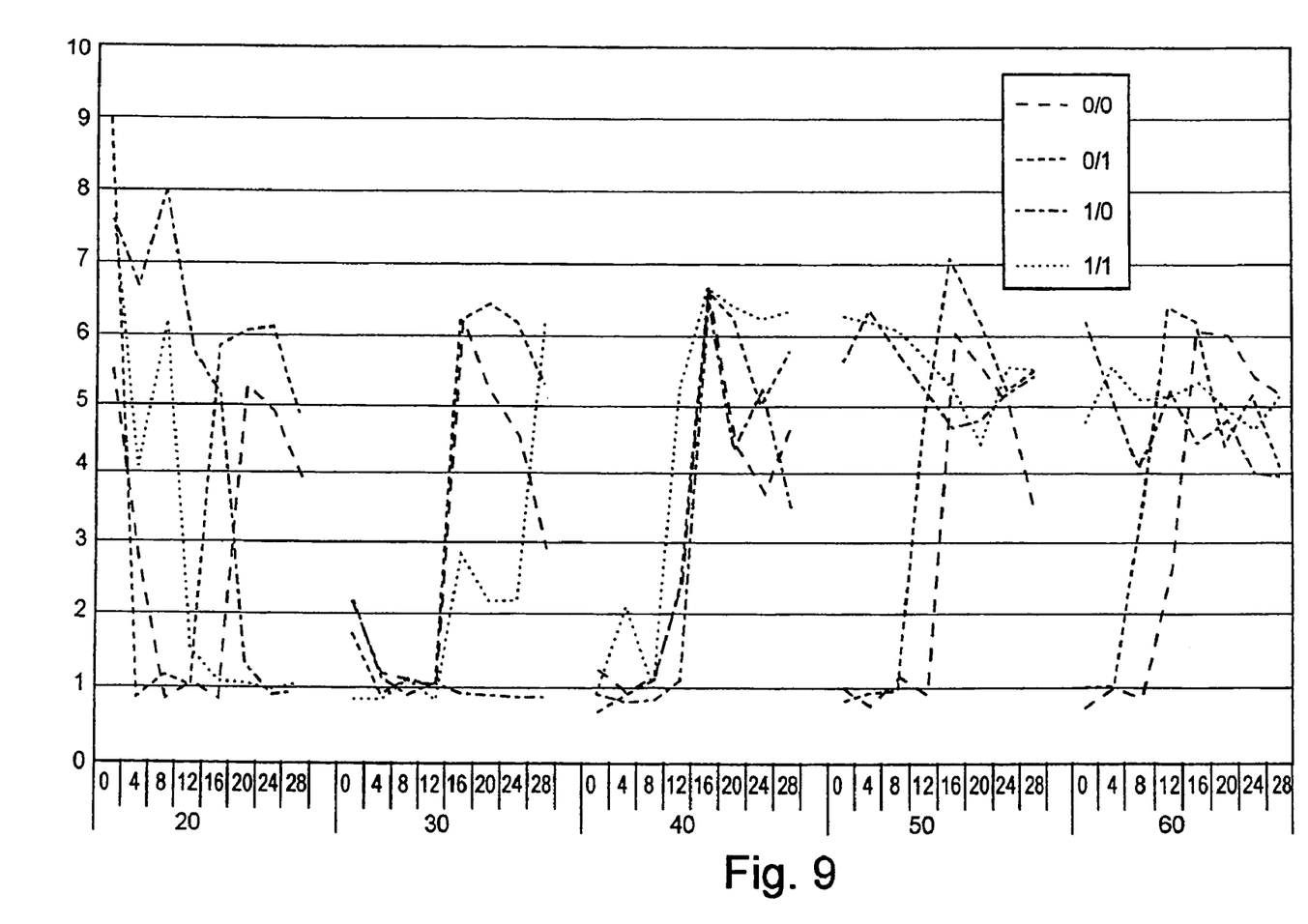
FIG. 9 illustrates the basic concept of optimizing the Minimum OSC 2902 to meet the WII criteria of operation 2032 of FIGS. 3B and 7B.

FIG. 9 illustrates the basic concept of optimizing the Minimum OSC 2902 to meet the WII criteria of operation 2032 of FIGS. 3B and 7B.

In FIG. 9, the vertical axis represents the percentage of Automatic Gain Control (AGC) range to AGC averages found at the preamplifier 224. The horizontal axis represents the combination of Write Current (Wc) as the lower number and OverShoot Control (OSC) as the higher number in label strip at the bottom of the Figure.

The inventors relied upon experimental data, which FIG. 9 summarizes, to conclude the following. Higher write strength causes greater Write Induced Interference (WII). Measuring Automatic Gain Control (AGC) changes after write operations provide a good indication of WII. The Minimum OSC 2922 should guarantee a WII criteria during repeated track writings. If the Minimum OSC 2922 does not guarantee the WII criteria, it should be reduced, and the test repeated.

The WII criteria should preferably be the AGC variation within a fixed ratio of the average AGC. One preferred fixed ratio is about ten percent. The repeated track writing should preferably be at least fifty repetitions.

The inventors have found the test method should preferably be applied to at least four radial zones of the disk surface accessed by the writer. The inventors have found the test method should preferably interpolate the OSC Collection for all of the radial zone collections, based upon tested OSC Collections regarding the writer for each of the tested radial zone collection members. It is preferable to perform read channel optimizing based upon these generated write parameter collections 2900.

The write parameter collection 2900 is a product of the process illustrated as operation 2000 of FIGS. 3A–3B.

The process of making a disk drive 10 may preferably include the following. Performing the steps of method 2000 of FIGS. 3A–3B to create the write parameter collection 2900, regarding the writer 2902 for at least one of the radial zone collections 2910. And installing write parameter collection 2900 into embedded controller 1000 within the disk drive 10. Note that installation preferably includes writing write parameter collection 2900 into a non-volatile memory component of memory 1120. Disk drive 10 is a product of this process.

The program system 2000 illustrated in FIGS. 3A–3B is an implementation of the method 2000 generating the write parameter collection 2900 of FIG. 3A. The apparatus implementing this method 2000 generating the write parameter collection 2900 includes a means for each of the operations shown in FIG. 3B. These means may include program steps, as well as, finite state machines, implementing at least part of each operation and the writer.

The invention also includes a method 2500 of controlling a writer 222-224-200 within a disk drive 10 using an OverShoot Control (OSC) Collection 2920 regarding the writer for a radial zone collection 2910 including at least two tracks on the rotating disk surface 12 as illustrated in FIG. 3A.

Figure 10A:
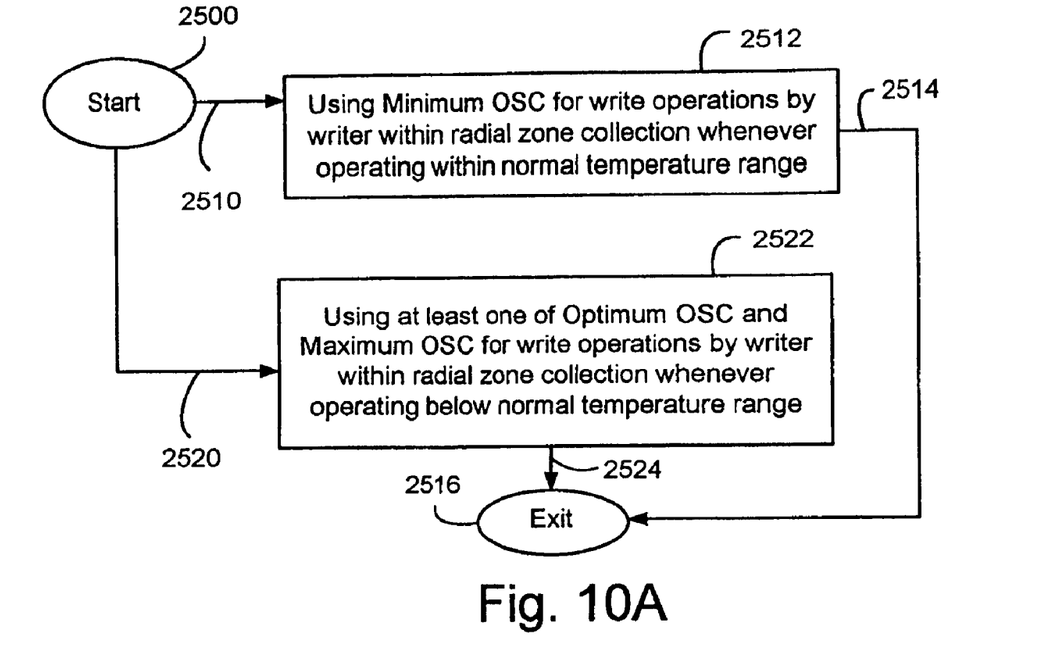
FIG. 10A illustrates a detail flowchart of operation 2500 of FIG. 3A controlling a writer 222-224-200 within a disk drive 10 using write parameter collection 2900 for at least write operations.

FIG. 10A illustrates a detail flowchart of operation 2500 of FIG. 3A controlling a writer 222-224-200 within a disk drive 10 using write parameter collection 2900 for at least write operations.

Operation 2512 performs using the Minimum OSC 2922 for write operations by the writer within the radial zone collection 2910 whenever operating within a normal temperature range. Operation 2522 performs using at least one of the Optimum OSC 2924 and the Maximum OSC 2926 for write operations by the writer within the radial zone collection 2910 whenever operating below the normal temperature range.

Figure 10B:
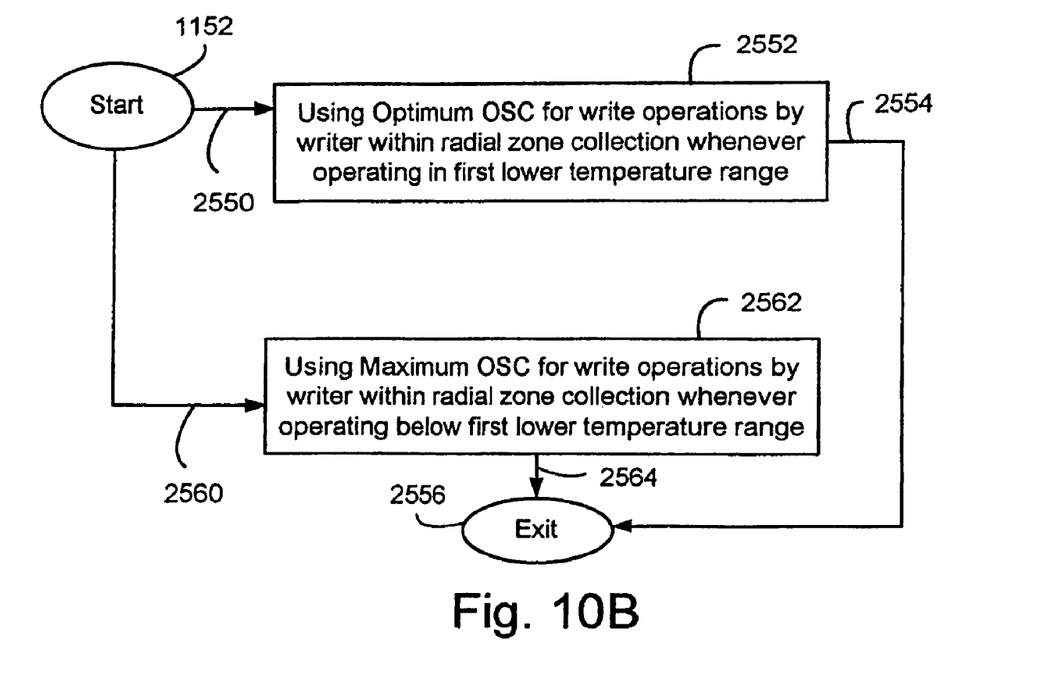
FIG. 10B illustrates a detail flowchart of operation 2522 of FIG. 10A further using at least one of the Optimum OSC and the Maximum OSC.

FIG. 10B illustrates a detail flowchart of operation 2522 of FIG. 10A further using at least one of the Optimum OSC and the Maximum OSC.

Operation 2552 performs using the Optimum OSC 2924 for write operations by the writer within the radial zone collection 2910 whenever operating in a first lower temperature range. Operation 2562 performs using the Maximum OSC 2926 for write operations by the writer within the radial zone collection 2910 whenever operating below the first lower temperature range.

The preceding embodiments have been provided by way of example and are not meant to constrain the scope of the following claims.

The invention claimed is:

1. A method of optimizing a disk drive, comprising the steps:
   generating an Overshoot Control (OSC) Collection regarding a writer for any radial zone collection on a rotating disk surface included in said disk drive;
   and, for at least one of said radial zone collections, wherein each of a number of members of said OSC Collection include a Minimum OSC, a Maximum OSC, and an Optimum OSC;
   read channel optimizing based upon said Minimum OSC regarding said writer for said radial zone collection to create members of a write parameter collection including said members of said OSC collection;
   wherein the step generating said OSC Collection further comprises the steps:
   for each of said radial zone collections included in a test zone collection, generating said OSC collection regarding said writer for said members of said radial zone collection;
   and interpolating said OSC Collection regarding said writer for all of said radial zone collections based upon said OSC Collections regarding said writer for each member of said test zone collection;
   wherein said test zone collection includes at least four of said radial zone collections;
   wherein each of said radial zone collections include at least three radially consecutive tracks on said rotating disk surface; and
   wherein the step generating said OSC collection regarding said writer for said member of said radial zone collection, further comprises the steps:
   optimizing members of said OSC collection to create a Bit Error Rate (BER);
   optimizing said Minimum OSC to meet an Adjacent Track Writing (ATW) criteria based upon said BER; and
   optimizing said Minimum OSC to meet a Write Induced Instability (WII) criteria.

2. The method of claim 1, wherein the step read channel optimizing further comprises at least one of the steps:
   read channel optimizing for other parameters based upon a default write current and a default of said OSC to create an initial Read Channel Optimization (RCO) other parameter list;
   and read channel optimizing to create an initial write current and said initial OSC based upon said initial RCO other parameters;
   wherein said initial OSC is based at least partly on said default write current and said default 10 OSC.

3. A method of optimizing a disk drive, comprising the steps:
   generating an Overshoot Control (OSC) Collection regarding a writer for at least one radial zone collection on a rotating disk surface included in said disk drive; and, for at least one said radial zone collection,
   wherein any and each member of said OSC Collection includes a Minimum OSC, a Maximum OSC, and an Optimum OSC;
   read channel optimizing based upon said Minimum OSC regarding said writer for said radial zone collection to create members of a write parameter collection including the members of said OSC collection;
   wherein the step generating said OSC Collection further comprises the steps:
   for each of said radial zone collections included in a test zone collection, generating said OSC collection regarding said writer for said member of said radial zone collection;
   and interpolating said OSC Collection regarding said writer for all of said radial zone collections based upon said OSC Collections regarding said writer for each of said member of said test zone collection;
   wherein said test zone collection includes at least four of said radial zone collections;
   wherein each of said radial zone collections include at least three radially consecutive tracks on said rotating disk surface; and
   wherein the step of read channel optimizing further comprises at least one of the steps:
   read channel optimizing for other parameters based upon a default write current and a default of said OSC to create an initial Read Channel Optimization (RCO) other parameter list;
   and read channel optimizing to create an initial write current and said initial OSC based upon said initial RCO other parameters;
   wherein said initial OSC is based at least partly on said default write current and said default OSC.

4. The method of claim 3, wherein the step generating said OSC collection regarding said writer for said radial zone collection member, further comprises the steps:
   optimizing said OSC collection members to create a Bit Error Rate (BER);
   optimizing said Minimum OSC to meet an Adjacent Track Writing (ATW) criteria based upon said BER;
   and optimizing said Minimum OSC to meet a Write Induced Instability (WII) criteria.

* * * * *